United States Patent
Jess

(10) Patent No.: US 8,386,708 B2
(45) Date of Patent: Feb. 26, 2013

(54) METHOD FOR COUPLING SUB-LUN LOAD MEASURING METADATA SIZE TO STORAGE TIER UTILIZATION IN DYNAMIC STORAGE TIERING

(75) Inventor: Martin Jess, Erie, CO (US)

(73) Assignee: LSI Corporation, Milpitas, CA (US)

( * ) Notice: Subject to any disclaimer, the term of this patent is extended or adjusted under 35 U.S.C. 154(b) by 203 days.

(21) Appl. No.: 12/887,190

(22) Filed: Sep. 21, 2010

(65) Prior Publication Data

US 2012/0072670 A1 Mar. 22, 2012

(51) Int. Cl.
*G06F 12/00* (2006.01)
*G06F 13/00* (2006.01)
(52) U.S. Cl. ........ 711/114; 711/118; 711/134; 711/136; 711/154; 711/156; 711/159; 711/160
(58) Field of Classification Search .................. 711/114, 711/118, 136, 134, 154, 156, 159, 160
See application file for complete search history.

(56) References Cited

U.S. PATENT DOCUMENTS

| | | | |
|---|---|---|---|
| 7,260,679 B2 | 8/2007 | Benhase et al. | |
| 2003/0088739 A1* | 5/2003 | Wilkes et al. | 711/133 |
| 2010/0070643 A1 | 3/2010 | Puranik et al. | |
| 2012/0017041 A1* | 1/2012 | Zwisler | 711/114 |

OTHER PUBLICATIONS

Howard Marks; Cache or Tier? Flash by Any Other Name; Network Computing; Copyright 2009 United Business Media LLC; Mar. 30, 2010; 2 pages.

* cited by examiner

*Primary Examiner* — Midys Rojas
(74) *Attorney, Agent, or Firm* — Suiter Swantz pc llo

(57) ABSTRACT

A method for metadata management in a storage system configured for supporting sub-LUN tiering. The method may comprise providing a metadata queue of a specific size; determining whether the metadata for a particular sub-LUN is cached in the metadata queue; updating the metadata for the particular sub-LUN when the metadata for the particular sub-LUN is cached in the metadata queue; inserting the metadata for the particular sub-LUN to the metadata queue when the metadata queue is not full and the metadata is not cached; replacing an entry in the metadata queue with the metadata for the particular sub-LUN when the metadata queue is full and the metadata is not cached; and identifying at least one frequently accessed sub-LUN for moving to a higher performing tier in the storage system, the at least one frequently accessed sub-LUN being identified based on the metadata cached in the metadata queue.

20 Claims, 4 Drawing Sheets

METHOD FOR COUPLING SUB-LUN LOAD MEASURING METADATA SIZE TO STORAGE TIER UTILIZATION IN DYNAMIC STORAGE TIERING

TECHNICAL FIELD

The present invention relates to the field of electronic data storage and particularly to a method for managing storage tier utilization in dynamic storage tiering.

BACKGROUND

Dynamic Storage Tiering (DST) is the concept of grouping storage devices into tiers based on their characteristics, and relocating data dynamically to leverage specific capabilities of the underlying devices. This requires that the data is classified in some way that lets the DST mechanism place a particular data element in its "optimal" tier. The concept of DST may be applied to several different Quality of Service (QoS) attributes of a storage tier; an exemplary attribute may be performance management. For performance management, the DST objective is to identify data that has a high activity level (also called load) and place it in high performing storage tiers. The utilization of high performing storage tiers should be as high as possible as these are generally more expensive than the lower performing storage tiers and a high utilization of the more expensive storage devices provides a better return on investment for the user.

It is equally important to detect when the activity level changes from high to low and move the data back to lower performing storage tiers, so it does not take up capacity in the higher performance storage pools that may be used by more active data. Automating the movement of data with higher activity levels to higher performing storage tiers and data with lower activity levels to lower performing storage tiers makes it much easier for the customer to get the most performance of the system without having to figure out what data has the highest activity and manually move that to higher performing storage tiers.

Certain DST systems may measure the load on an entire Logical Unit Number (LUN) and automatically move entire LUNs with a high activity level to higher performing storage pools. However, often the majority of the activity is really restricted to a few Logical Block Address (LBA) ranges in the LUN so this approach leads to lower utilization of the higher performance storage tier as most of it is occupied by LBA ranges that do not have a high activity level. In response to this problem, some approaches split the LBA ranges within a LUN into subsets called sub-LUNs and monitor the activity in the individual sub-LUNs and only move the most active sub-LUNs to the higher performing storage tiers and let the sub-LUNs with less activity remain in the lower performing storage tiers. Such techniques may be referred to as sub-LUN tiering. Sub-LUNs may be specified as an absolute size, for example 1 MB; or as a percentage of the LUN LBA range, for example 0.1% of the LUN.

SUMMARY

Accordingly, an embodiment of the present disclosure is directed to a method for metadata management in a storage system, wherein the storage system is configured for supporting sub-LUN tiering. The method may comprise providing a least recently used (LRU) queue of a specific size, the LRU queue configured for caching metadata for a specific number of sub-LUNs; determining whether the metadata for a particular sub-LUN is cached in the LRU queue when the particular sub-LUN is being accessed; updating the metadata for the particular sub-LUN and moving the updated metadata to the head of the LRU queue when the metadata for the particular sub-LUN is cached in the LRU queue; inserting the metadata for the particular sub-LUN to the LRU queue when the LRU queue is not full and the metadata for the particular sub-LUN is not cached in the LRU queue; replacing a last entry in the LRU queue with the metadata for the particular sub-LUN when the LRU queue is full and the metadata for the particular sub-LUN is not cached in the LRU queue; and identifying at least one frequently accessed sub-LUN for moving to a higher performing tier in the storage system, the at least one frequently accessed sub-LUN being identified based on the metadata cached in the LRU queue.

A further embodiment of the present disclosure is directed to a method for metadata management in a storage system, wherein the storage system is configured for supporting sub-LUN tiering. The method may comprise providing a metadata queue of a specific size, the metadata queue configured for caching metadata for a specific number of sub-LUNs; determining whether the metadata for a particular sub-LUN is cached in the metadata queue when the particular sub-LUN is being accessed; updating the metadata for the particular sub-LUN when the metadata for the particular sub-LUN is cached in the metadata queue; inserting the metadata for the particular sub-LUN to the metadata queue when the metadata queue is not full and the metadata for the particular sub-LUN is not cached in the metadata queue; replacing an entry in the metadata queue with the metadata for the particular sub-LUN when the metadata queue is full and the metadata for the particular sub-LUN is not cached in the metadata queue; and identifying at least one frequently accessed sub-LUN for moving to a higher performing tier in the storage system, the at least one frequently accessed sub-LUN being identified based on the metadata cached in the metadata queue.

An additional embodiment of the present disclosure is directed to a storage system configured for supporting sub-LUN tiering. The storage system may comprise a higher performing tier and a lower performing tier. The storage system may further comprise a metadata queue of a specific size for caching metadata for a specific number of sub-LUNs; a metadata queue controller configured for managing the metadata cached in the metadata queue and identifying at least one frequently accessed sub-LUN for moving to the higher performing tier, wherein the at least one frequently accessed sub-LUN being identified based on the metadata cached in the metadata queue; and a metadata queue adjustment module configured for determining a performance level of the higher performing tier and adjusting the size of the metadata queue based on the performance level determined.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Figure 1:
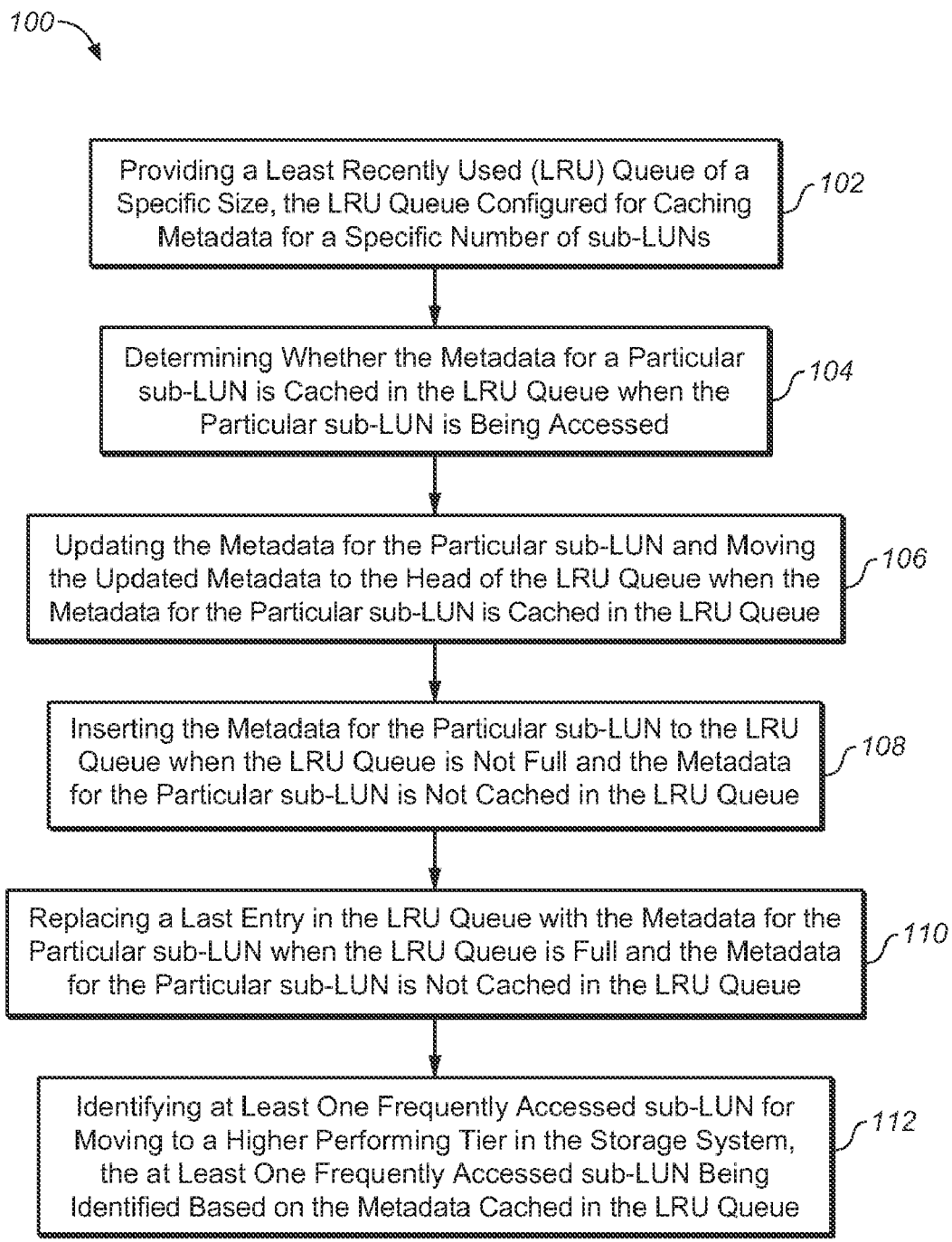
FIG. 1 is a flow diagram illustrating a method for metadata management in a DST storage system.

Reference will now be made in detail to the presently preferred embodiments of the invention, examples of which are illustrated in the accompanying drawings.

A disadvantage of the sub-LUN approach (splitting the LBA ranges within a LUN into subsets called sub-LUNs and monitor the activities of each individual sub-LUN) is the amount of metadata that is needed for the load monitoring in large LUNs. By moving to a finer granularity of sub-LUNs (a smaller sub-LUN size), the amount of metadata needed for a large LUN may increase dramatically. Consider an approach where the LUN is split into 1 MB LBA ranges and the activity is measured for each 1 MB sub-LUN. For example, the following may be measured for each sub-LUN:

Accumulated time: T

Accumulated number of I/Os: O

Time stamp for last access (in number of clicks for example)

Typically, a 64 bit field may be utilized for recording each of the above measurement, which implies that 3×8=32 bytes may be needed to record the metadata for each sub-LUN. For 1 GB of monitored LUNs, there will be 1K (1024) 1 MB sub-LUNs and a metadata footprint of 1024×32=32 KB. However, for 1 TB of monitored LUNs, there is 32 MB of metadata and for 1 PB of monitored LUNs there will be 32 GB of metadata.

The examples above illustrate that as soon as the monitored LUN capacity increases, so does the metadata footprint and it quickly reaches a point where it may not be feasible to keep all the metadata in the main memory (RAM) of a storage system. Otherwise, it may lead to complicated caching of the metadata itself and may also affect performance in a negative way.

The present disclosure is directed to a method for managing storage tier utilization in dynamic storage tiering. A metadata queue implementing the Least Recently Used (LRU) algorithm (may be referred to as the metadata LRU queue) is utilized to record and monitor the metadata for only the most active sub-LUNs; the less active sub-LUNs may be ignored and no metadata is kept for them for any extended period of time. By only keeping metadata for the most active sub-LUNs instead of all sub-LUNs, the method of the present disclosure is capable of monitoring activity/load in much larger LUNs without requiring excessive main memory in the storage system.

Furthermore, the method of the present disclosure may couple the size of the metadata LRU queue to the storage tier utilization in the DST system. The method may be configured to automatically adjust the size of the metadata LRU queue to maximize the utilization of the higher performing storage tiers. For example, if the utilization of the higher performing storage tiers is too low, the size of the metadata LRU queue may be gradually increased (i.e., more sub-LUNs will have metadata kept in the LRU queue) until utilization reaches the desired level. On the other hand, if hotspots are detected but cannot be placed in higher performing storage tiers due to their utilization being maxed out, the size of the metadata LRU queue may be gradually reduced (i.e., less sub-LUNs will have metadata kept in the LRU queue) until a stable state is reached. In this manner, the user of the DST system may only need to set the upper and lower limit for the metadata LRU size, and the method of the present disclosure may automatically adjust the metadata LRU size to support the maximum utilization of the higher performing storage tiers.

Referring to FIG. 1, a flow diagram illustrating steps performed by a metadata management method 100 is shown. A least recently used (LRU) queue of a specific size is provided in step 102. The LRU queue is a queue configured for caching metadata for a specific number of sub-LUNs. The LRU algorithm is used to hold the metadata for the most active sub-LUNs. The metadata for other sub-LUNs is only kept in the LRU queue for short periods of time and is not stored anywhere else. The number of elements stored in the LRU (the size of the LRU queue) is fixed which limits the memory footprint. In one embodiment, the following attributes/fields are kept for each metadata element:

An accumulated access time;

An accumulated access measurement (e.g., an input/output count, or the size of data transfer);

A time stamp for the most recent access to the sub-LUN; and

An indicator for indicating whether the sub-LUN is moved to the higher performing tier in the storage system.

When a particular sub-LUN is accessed, step 104 determines whether the metadata for this particular sub-LUN is cached in the LRU queue. If the metadata for this particular sub-LUN is cached in the LRU queue, step 106 updates the metadata for the particular sub-LUN and moves the updated metadata to the head of the LRU queue. However, if the metadata for this particular sub-LUN is not cached in the LRU queue, and the LRU queue is not full, step 108 may allocate a new metadata entry for caching the metadata for the particular sub-LUN, initialize the new metadata entry and insert the new metadata entry at the head of the LRU queue.

Since the LRU queue is configured for caching metadata for a specific number of sub-LUNs, when that number is reached and some new sub-LUN is accessed whose metadata is not found in the LRU queue, step 110 may replace the last element in the LRU queue with the metadata for the new sub-LUN. In this manner, the least recently accessed sub-LUN's activity measurement data is overwritten. This approach puts an upper limit on the footprint of the activity measurement metadata and keeps the most active sub-LUN's metadata towards the head of the LRU thus aiding the detection of hotspots. It also ensures that sub-LUNs that are infrequently accessed will not have metadata associated with them for very long as the corresponding activity measurement element will be moved to the end of the LRU queue and eventually be overwritten.

In the event that the metadata for a particular sub-LUN is hit in the LRU queue, the time stamp for the most recent access to the sub-LUN may be updated accordingly. In addition, the access time to this sub-LUN may be obtained and added to the accumulated access time recorded in the metadata. Also updated in the metadata is the accumulated access measurement. For example, if the accumulated access measurement represents the total input/output (I/O) count associated with this sub-LUN, the total I/O count may be incremented by 1. Alternatively, if the accumulated access measurement represents the size of data transfer (e.g., bytes read and/or written) associated with this sub-LUN, the size of data transfer may be updated accordingly. In this manner, a utilization rate for this particular sub-LUN may be calculated based on information recorded in its metadata. In one embodiment, the utilization rate is calculated as (Accumulated Access Measurement)÷(Accumulated Access Time). That is, if the accumulated access measurement represents the total input/output (I/O) count associated with this sub-LUN, the utilization rate may represent an average number of I/Os per time unit. Alternatively, if the accumulated access measurement represents the size of data transfer (e.g., bytes read and/or written) associated with this sub-LUN, the utilization rate may represent an average number of bytes per time unit.

Step 112 is configured for identifying one or more frequently accessed sub-LUNs as hotspots for moving to a higher performing tier in the storage system. The hotspots may be identified based on the utilization rate associated with each sub-LUN that has its metadata cached in the LRU queue (other sub-LUNs that do not have metadata cached in the LRU queue are not considered). For example, the hotspots may be identified as the sub-LUNs that have higher utilization rates than most or all other sub-LUNs that have metadata cached in the LRU queue. In this configuration, the metadata entries that remain in the LRU queue for the longest time may represent the most active sub-LUNs in the LUN. On the other hand, sub-LUNs that have metadata cached in the LRU queue only for brief periods of time or not at all may represent less active or inactive LBA ranges in the LUN.

In one embodiment, if a particular sub-LUN is moved to a higher performing tier, the indicator of its corresponding metadata in the LRU queue is marked to indicate such a transfer took place. In the event that a metadata entry is to be replaced because the LRU is full, it is checked to determine if it represents a sub-LUN that was moved to a faster storage tier earlier. If this is the case, a process (e.g., a background process) may be initiated to move the sub-LUN corresponding to this to-be-replaced metadata entry to a lower performing tier in the storage system.

Figure 2:
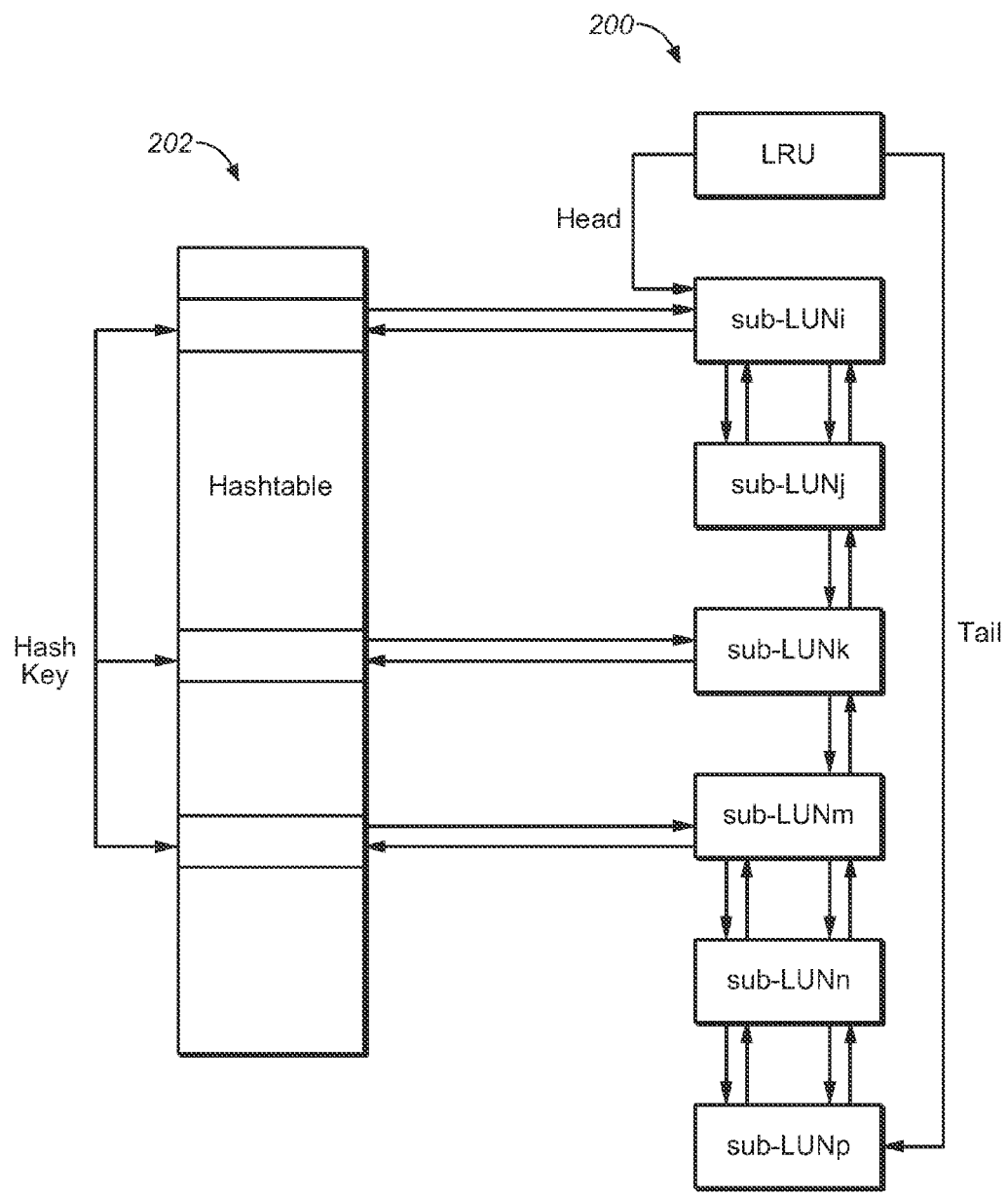
FIG. 2 is a block diagram illustrating an exemplary implementation of a metadata queue.

Referring to FIG. 2, a block diagram illustrating an exemplary implementation of the LRU queue 200 is shown. The LRU queue 200 may be implemented as a double linked list where the first and the last element of the queue are tracked by two variables (e.g., pointers). In addition, a lookup mechanism may be utilized for the LRU queue 200. The lookup mechanism may determine if a particular element is already in the LRU queue 200. This lookup mechanism may be a simple search in the LRU queue 200 or a more sophisticated hash table approach where the LRU queue elements are also elements in a hash table 202 facilitating a fast lookup. The hash key may include a combination of fields that identifies the individual elements in the LRU queue 200. For example, the internal LUN identifier and the starting LBA of the sub-LUN in may be utilized as a possible hash key.

Furthermore, two additional variables/pointers may be utilized for tracking the metadata elements with the highest utilization rates. For example, an element pointer (Emax) and the highest utilization rate value (Amax) may be kept together with the LRU head and tail pointers. Whenever a metadata element E is touched/hit, its utilization rate may be calculated and compared with the Amax. If the utilization rate of E is greater than Amax, then set the utilization rate of E as the new Amax and set Emax to point to element E. In this manner, it is always possible to find the metadata element with the highest utilization rate. In addition, the LRU hash table 202 may be utilized to determine if any adjacent sub-LUNs are part of this hotspot too by looking at their corresponding utilization rates. While the exemplary LRU queue is implemented as a double-linked list having a lookup mechanism, it is understood that various other implementations of the LRU queue may be utilized without departing from the spirit and scope of the present disclosure.

Figure 3:
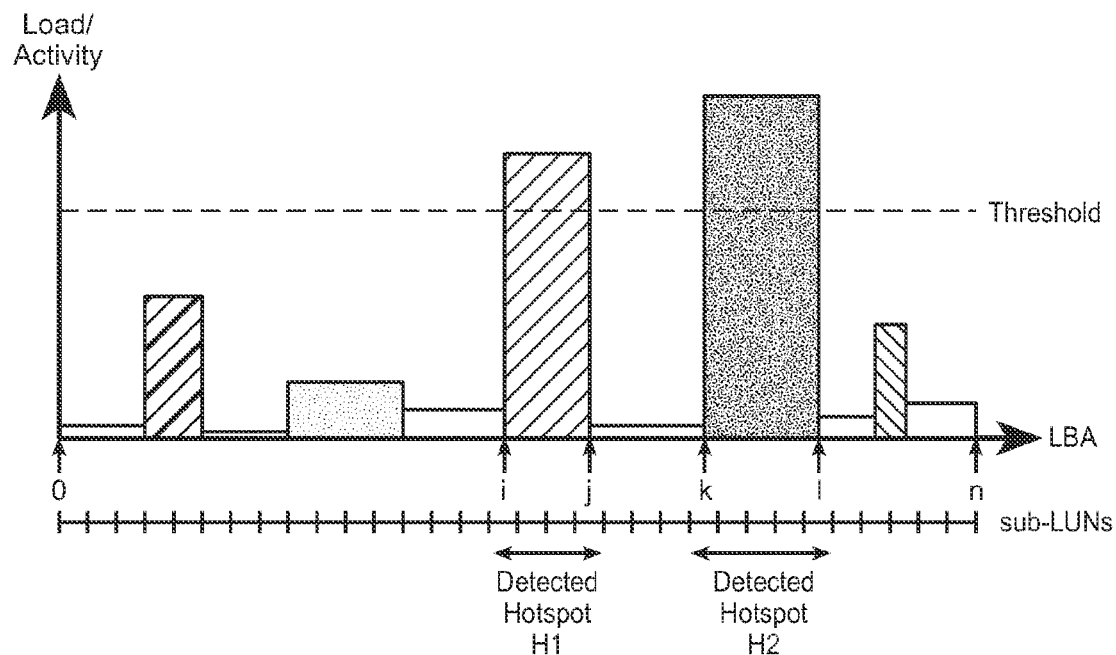
FIG. 3 is an illustration depicting an effective threshold provided by the metadata queue.
Figure 4:
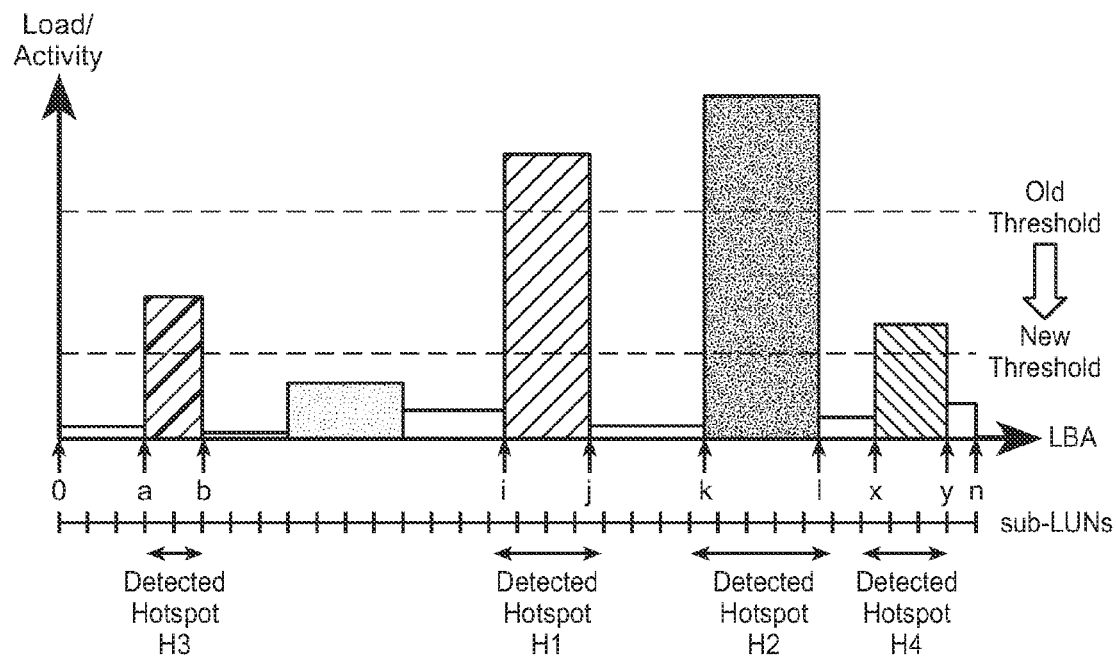
FIG. 4 is an illustration depicting the relationship between the effective threshold and the size of the metadata queue.

As hotspots are detected in the LRU queue, the corresponding sub-LUNs may be moved to the higher performing storage tiers. However, since the size of the LRU is bounded, some less active hotspots may not be detected as they may move through the LRU queue too fast. Therefore, the size of the LRU queue essentially implies a threshold for which hotspots may be detected and which ones may be ignored. FIG. 3 illustrates the effective threshold established by the size of the LRU queue. In this example, the size of the LRU queue is set such that only hotspots H1 (e.g., LBAs i through j) and H2 (LBAs k through l) are detected. That is, only their metadata entries may remain in the LRU queue with its current size. Increasing the size of the LRU queue may let the system to detect more hotspots as illustrated in FIG. 4, and hotspots H3 and H4 may now be detected in addition to H1 and H2 because the LRU queue can cache more metadata entries. Therefore, increasing the size of the LRU queue essentially lowers the implied threshold.

Consequently, the metadata LRU queue may be utilized in an adaptive feedback loop with the utilization of the higher performing tiers to reach the maximum utilization of the higher performing storage tiers. For example, if the utilization of the higher performing storage tiers is lower than the desired maximum, the size of the LRU queue may be increased so that more hotspots can be detected and moved to the higher performing storage tiers so their utilization is increased. Similarly, if hotspots are detected that cannot be moved to higher performing storage tiers due to their utilization being maxed out, the size of the LRU queue may be reduced so that fewer hotspots are detected and take up space in the LRU queue. Since the higher performing storage tiers are already "full", their utilization may not be affected by the reduction of the LRU queue size but main memory is freed up for other uses.

In one embodiment, the size of the metadata LRU queue, Size(LRU), is variable between a minimum configured limit, MinLimit(LRU), and a maximum configured limit, MaxLimit(LRU). That is, MinLimit(LRU)≦Size(LRU)≦MaxLimit(LRU). Size(LRU) is coupled to the utilization of the higher performing storage tiers through an adaptive feedback loop. If the utilization is low, the LRU size is increased in certain increments until the maximum utilization is reached or Size(LRU)=MaxLimit(LRU), whichever comes first. When a LRU metadata entry is reused, i.e., overwritten, the utilization of the high performance storage tiers is checked. If the utilization is lower than the desired maximum and Size(LRU)<MaxLimit(LRU), the size of the LRU is increased by some increment. If the utilization is below maximum and Size(LRU)=MaxLimit(LRU), the system administrator may be notified that the MaxLimit(LRU) is set too low to reach the maximum utilization for the higher performing storage tiers.

However, when a hotspot is identified in the LRU queue, but the corresponding sub-LUNs cannot be moved to a higher performing tier due to the tier having reached maximum utilization, the size of the LRU queue is likely set too high, i.e., hotspots have been identified but there is no capacity available for them in the higher performing storage tiers. In this case, the size of the LRU queue may be reduced by some number of elements unless Size(LRU)=MinLimit(LRU). If the higher performance tiers' utilization is at their maximum and Size(LRU)=MinLimit(LRU), the system administrator may be notified that the LRU minimum is set too high.

It is contemplated that a grace period may be applied after increasing the LRU queue size to give the LRU queue size increase a chance to take effect on the utilization. For example, if a metadata entry in the LRU queue is reused within this grace period and the utilization is below maximum, the LRU queue size may not increased again immediately. Such a grace period may help preventing overshooting the LRU queue size increases where the LRU queue is made bigger than what is really needed to get maximum utilization of the higher performing storage tiers.

It is also contemplated while the least recently used (LRU) algorithm is referenced in the present disclosure, it is merely exemplary and that various other cache algorithms (e.g., least frequently used, adaptive replacement cache or the like) may be utilized for selecting managing the metadata queue without departing from the spirit and scope of the present disclosure.

Figure 5:
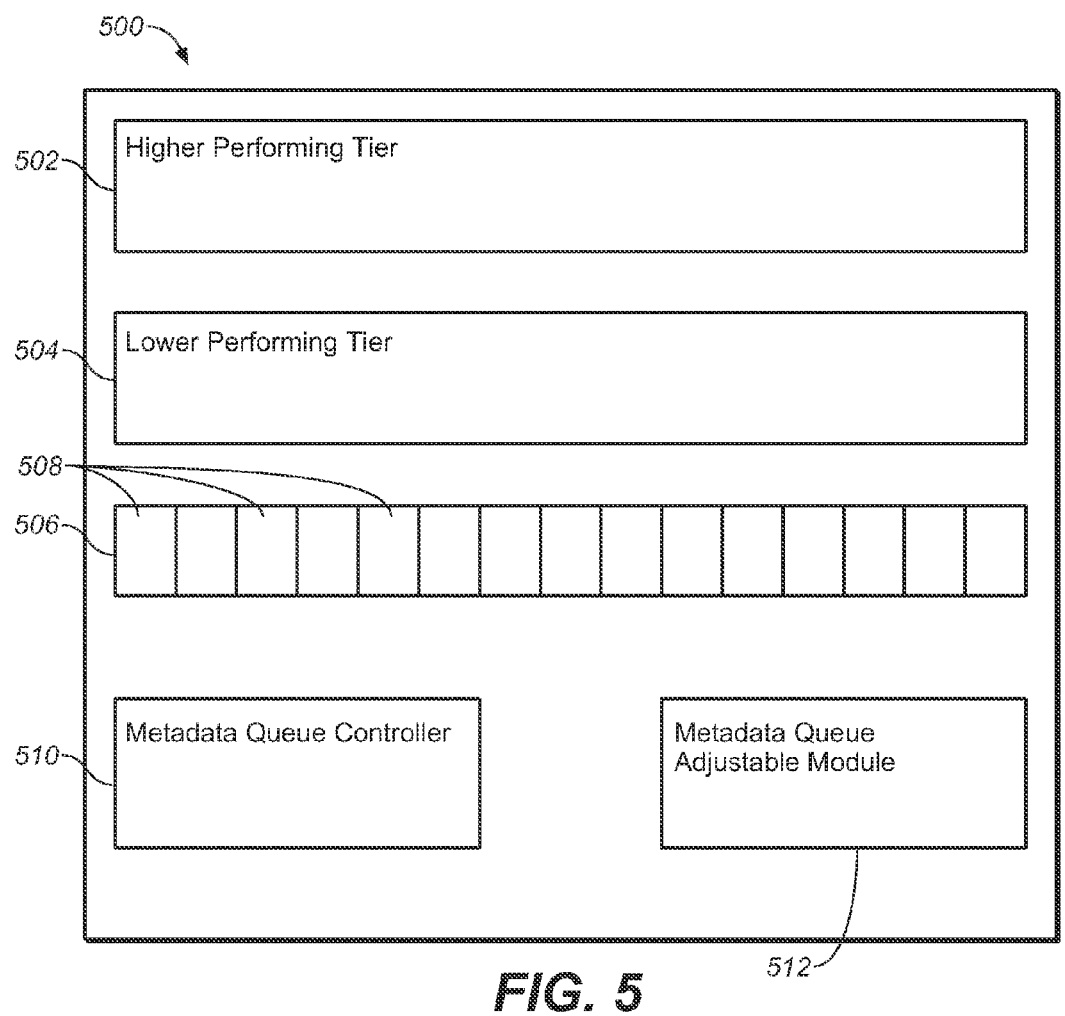
FIG. 5 is a block diagram illustrating a storage system configured for supporting sub-LUN tiering in accordance with the present disclosure.

Referring to FIG. 5, a block diagram illustrating a storage system 500 configured for supporting sub-LUN tiering is shown. The storage system 500 has a plurality of tiers having different performance levels. For example, the storage system 500 may include a higher performing tier 502 and a lower performing tier 504. The storage system 500 also utilizes a metadata queue 506 of a specific size for caching metadata entries 508 for a specific number of sub-LUNs. A metadata queue controller 510 may be utilized to managing the metadata cached in the metadata queue 506 and identifying at least one frequently accessed sub-LUN for moving to the higher performing tier as previously described.

Furthermore, the size of the metadata queue may be adjusted to affect the storage tier utilization in the storage system 500. In one embodiment, the storage system 500 includes a metadata queue adjustment module 512. The adjustment module 512 may be configured for determining a performance level of the higher performing tier 502 and adjusting the size of the metadata queue 506 based on the performance level as previously described.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for metadata management in a storage system, the storage system configured for supporting sub-LUN tiering, the method comprising:
providing a least recently used (LRU) queue of a specific size, the LRU queue configured for caching metadata for a specific number of sub-LUNs;
determining whether the metadata for a particular sub-LUN is cached in the LRU queue when the particular sub-LUN is being accessed;
updating the metadata for the particular sub-LUN and moving the updated metadata to the head of the LRU queue when the metadata for the particular sub-LUN is cached in the LRU queue;
inserting the metadata for the particular sub-LUN to the LRU queue when the LRU queue is not full and the metadata for the particular sub-LUN is not cached in the LRU queue;
replacing a last entry in the LRU queue with the metadata for the particular sub-LUN when the LRU queue is full and the metadata for the particular sub-LUN is not cached in the LRU queue; and
identifying at least one frequently accessed sub-LUN for moving to a higher performing tier in the storage system, the at least one frequently accessed sub-LUN being identified based on the metadata cached in the LRU queue.

2. The method of claim 1, wherein the metadata for each sub-LUN comprises:
an accumulated access time to the sub-LUN;
an accumulated access measurement associated with the sub-LUN, the accumulated access measurement being at least one of: an input/output count, and a size of data transfer;
a time stamp for most recent access to the sub-LUN; and
an indicator configured for indicating whether the sub-LUN is moved to the higher performing tier in the storage system.

3. The method of claim 2, wherein identifying at least one frequently accessed sub-LUN further comprises:
calculating a utilization rate for each sub-LUN having metadata cached in the LRU queue, the utilization rate being calculated at least partially based on the accumulated access time and the accumulated access measurement associated with each sub-LUN; and
identifying at least one sub-LUN as frequently accessed based on the utilization rate for each sub-LUN having metadata cached in the LRU queue.

4. The method of claim 1, wherein replacing a last entry in the LRU queue further comprises:
determining whether the sub-LUN corresponding to the metadata cached as the last entry in the LRU queue is in the higher performing tier in the storage system;
initiating a process to move the sub-LUN corresponding to the metadata cached as the last entry in the LRU queue to a lower performing tier in the storage system.

5. The method of claim 1, further comprising:
determining a performance level of the higher performing tier in the storage system; and
increasing the size of the LRU queue to cache metadata for at least one additional sub-LUN when the performance level of the higher performing tier is below a predetermined level.

6. The method of claim 1, further comprising:
determining a performance level of the higher performing tier in the storage system; and
decreasing the size of the LRU queue to cache metadata for at least one less sub-LUN when the performance level of the higher performing tier is above a predetermined level.

7. The method of claim 1, further comprising:
specifying an upper limit and a lower limit for the size of the LRU queue.

8. A method for metadata management in a storage system, the storage system configured for supporting sub-LUN tiering, the method comprising:
providing a metadata queue of a specific size, the metadata queue configured for caching metadata for a specific number of sub-LUNs;
determining whether the metadata for a particular sub-LUN is cached in the metadata queue when the particular sub-LUN is being accessed;
updating the metadata for the particular sub-LUN when the metadata for the particular sub-LUN is cached in the metadata queue;
inserting the metadata for the particular sub-LUN to the metadata queue when the metadata queue is not full and the metadata for the particular sub-LUN is not cached in the metadata queue;
replacing an entry in the metadata queue with the metadata for the particular sub-LUN when the metadata queue is full and the metadata for the particular sub-LUN is not cached in the metadata queue; and
identifying at least one frequently accessed sub-LUN for moving to a higher performing tier in the storage system, the at least one frequently accessed sub-LUN being identified based on the metadata cached in the metadata queue.

9. The method of claim 8, wherein the metadata for each sub-LUN comprises:
an accumulated access time to the sub-LUN;
an accumulated access measurement associated with the sub-LUN, the accumulated access measurement being at least one of: an input/output count, and a size of data transfer;
a time stamp for most recent access to the sub-LUN; and
an indicator configured for indicating whether the sub-LUN is moved to the higher performing tier in the storage system.

10. The method of claim 9, wherein identifying at least one frequently accessed sub-LUN further comprises:
calculating a utilization rate for each sub-LUN having metadata cached in the metadata queue, the utilization rate being calculated at least partially based on the accumulated access time and the accumulated access measurement associated with each sub-LUN; and
identifying at least one frequently accessed sub-LUN based on the utilization rate for each sub-LUN having metadata cached in the metadata queue.

11. The method of claim 9, wherein replacing an entry in the LRU queue further comprises:
determining whether the sub-LUN corresponding to the metadata cached in the entry to be replaced is in the higher performing tier in the storage system;
initiating a process to move the sub-LUN corresponding to the metadata cached in the entry to be replaced to a lower performing tier in the storage system.

12. The method of claim 8, further comprising:
determining a performance level of the higher performing tier in the storage system; and
increasing the size of the metadata queue to cache metadata for at least one additional sub-LUN when the performance level of the higher performing tier is below a predetermined level; and
decreasing the size of the metadata queue to cache metadata for at least one less sub-LUN when the performance level of the higher performing tier is above a predetermined level.

13. The method of claim 12, further comprising:
specifying an upper limit and a lower limit for the size of the metadata queue.

14. The method of claim 8, wherein the metadata queue utilizes a least recently used cache algorithm.

15. A storage system configured for supporting sub-LUN tiering, comprising:
a higher performing tier;
a lower performing tier;
a metadata queue of a specific size for caching metadata for a specific number of sub-LUNs;
a metadata queue controller configured for managing the metadata cached in the metadata queue and identifying at least one frequently accessed sub-LUN for moving to the higher performing tier, wherein the at least one frequently accessed sub-LUN being identified based on the metadata cached in the metadata queue; and
a metadata queue adjustment module configured for determining a performance level of the higher performing tier and adjusting the size of the metadata queue based on the performance level determined.

16. The storage system of claim 15, wherein the metadata for each sub-LUN comprises:
an accumulated access time to the sub-LUN;
an accumulated access measurement associated with the sub-LUN, the accumulated access measurement being at least one of: an input/output count, and a size of data transfer;
a time stamp for most recent access to the sub-LUN; and
an indicator configured for indicating whether the sub-LUN is moved to the higher performing tier.

17. The storage system of claim 16, wherein identifying at least one frequently accessed sub-LUN further comprises:
calculating a utilization rate for each sub-LUN having metadata cached in the metadata queue, the utilization rate being calculated at least partially based on the accumulated access time and the accumulated access measurement associated with each sub-LUN; and
identifying at least one frequently accessed sub-LUN based on the utilization rate for each sub-LUN having metadata cached in the metadata queue.

18. The storage system of claim 15, wherein adjusting the size of the metadata queue based on the performance level determined further comprises:
increasing the size of the metadata queue to cache metadata for at least one additional sub-LUN when the performance level of the higher performing tier is below a predetermined level; and
decreasing the size of the LRU queue to cache metadata for at least one less sub-LUN when the performance level of the higher performing tier is above a predetermined level.

19. The storage system of claim 15, wherein the metadata queue adjustment module is configured for adjusting the size of the metadata queue within an upper limit and a lower limit.

20. The storage system of claim 15, wherein the metadata queue utilizes a least recently used cache algorithm.

* * * * *